(12) United States Patent
Chen (10) Patent No.: US 11,782,520 B2
(45) Date of Patent: Oct. 10, 2023

(54) BACKLIGHT KEYBOARD

(71) Applicant: DARFON ELECTRONICS CORP., Taoyuan (TW)

(72) Inventor: Chao-Yu Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 118 days.

(21) Appl. No.: 17/534,463

(22) Filed: Nov. 24, 2021

(65) Prior Publication Data

US 2022/0164038 A1    May 26, 2022

(30) Foreign Application Priority Data

Nov. 25, 2020  (TW) .................................. 109141288

(51) Int. Cl.
*G06F 3/02* (2006.01)
*H01H 13/83* (2006.01)

(52) U.S. Cl.
CPC ............ *G06F 3/0219* (2013.01); *H01H 13/83* (2013.01); *H01H 2219/054* (2013.01)

(58) Field of Classification Search
CPC ......... H01H 2219/00; H01H 2219/014; H01H 2219/016; H01H 2219/018; H01H 2219/02; H01H 2219/28; H01H 2219/034; H01H 2219/036; H01H 2219/039; H01H 2219/046; H01H 2219/054; H01H 2219/056; H01H 2219/064; H01H 2229/034; H01H 3/00; H01H 3/12; H01H 2009/00; H01H 2009/186; H01H 2013/00; H01H 2013/02; H01H 2013/026; H01H 2209/00; H01H 2209/016; H01H 2217/018; H01H 2217/032; H01H 13/00; H01H 13/14; H01H 13/70; H01H 13/7006; H01H 13/702; H01H 13/704; H01H 13/705;
(Continued)

(56) References Cited

U.S. PATENT DOCUMENTS 6,860,612 B2   3/2005  Chiang
8,319,129 B2  11/2012  Nishino
(Continued)

FOREIGN PATENT DOCUMENTS

CN      201622533 U    11/2010
CN      109872906 A     6/2019
(Continued)

*Primary Examiner* — Anthony R Jimenez
(74) *Attorney, Agent, or Firm* — Winston Hsu (57) ABSTRACT

A backlight keyboard includes a first language keyswitch set having adjacent first and second keyswitches, a first backlight module disposed under the first language keyswitch set, and a masking sheet. The masking sheet is suitable for the backlight keyboard and a second backlight keyboard including a second backlight module and a second language keyswitch set. The first and second keyswitches on the backlight keyboard coincide with a third keyswitch in the second language keyswitch set on the second backlight keyboard. The masking sheet has a first light-exit region layout corresponding to the first, second, and third keyswitches for allowing light to be incident to symbols on the first, second, and third keyswitches. In other words, the masking sheet of the present invention can be applied to different backlight keyboards having different language keyswitch sets.

9 Claims, 6 Drawing Sheets

(58) Field of Classification Search
CPC .... H01H 13/7057; H01H 13/83; H01H 13/85; G06F 3/0219; G06F 3/02
See application file for complete search history.

(56) References Cited

U.S. PATENT DOCUMENTS

| | | |
|---|---|---|
| 9,269,509 B2 | 2/2016 | Ho |
| 9,887,052 B1 * | 2/2018 | Lin .................. H01H 13/83 |
| 2014/0034472 A1 | 2/2014 | Krumpelman |
| 2018/0122598 A1 | 5/2018 | Kuscher |
| 2020/0343058 A1 | 10/2020 | Yen |

FOREIGN PATENT DOCUMENTS

| | | |
|---|---|---|
| TW | M525536 U | 7/2016 |
| TW | 201810329 A | 3/2018 |

* cited by examiner

BACKLIGHT KEYBOARD

BACKGROUND OF THE INVENTION

1. Field of the Invention

The present invention relates to a backlight keyboard, and more specifically, to a backlight keyboard having a masking sheet suitable for different language keyswitch sets.

2. Description of the Prior Art

Please refer to the prior art as recited in the patent U.S. Pat. No. 9,269,509B. A backlight keyboard utilizes a backlight module as a light source. In general, the backlight module includes a light guiding plate, a light emitting unit, and a masking sheet. Light emitted by the light emitting unit is guided by the light guiding plate to be emitted out of the backlight keyboard. The masking sheet is disposed on the light guiding plate. The masking sheet has a plurality of light-exit regions formed thereon corresponding to a plurality of keyswitches on the backlight keyboard for allowing light to be incident to symbols on the keyswitches, so as to generate the illumination effect. However, since a keyswitch layout on the backlight keyboard could be varied with different language families (e.g., U.S. language family, U.K. language family, Brazil language family, or Japanese language family), a light-exit region layout on the masking sheet could be varied accordingly. As such, it may cause the problem that the masking sheet cannot be commonly applied to different backlight keyboards with different language families, so as to increase the manufacturing cost of the masking sheet.

SUMMARY OF THE INVENTION

The present invention provides a backlight keyboard. The backlight keyboard includes a first language keyswitch set, a first backlight module, and a masking sheet. The first language keyswitch set has a first keyswitch and a second keyswitch adjacent to each other. The first backlight module is disposed under the first language keyswitch set for providing light to the first language keyswitch set. The masking sheet is suitable for the backlight keyboard and a second backlight keyboard. The second backlight keyboard includes a second backlight module and a second language keyswitch set. Positions of the first keyswitch and the second keyswitch on the backlight keyboard coincide with a position of a third keyswitch in the second language keyswitch set on the second backlight keyboard. The masking sheet has a first light-exit region layout corresponding to the first keyswitch, the second keyswitch and the third keyswitch for allowing light to be incident to symbols on the first keyswitch, the second keyswitch and the third keyswitch.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
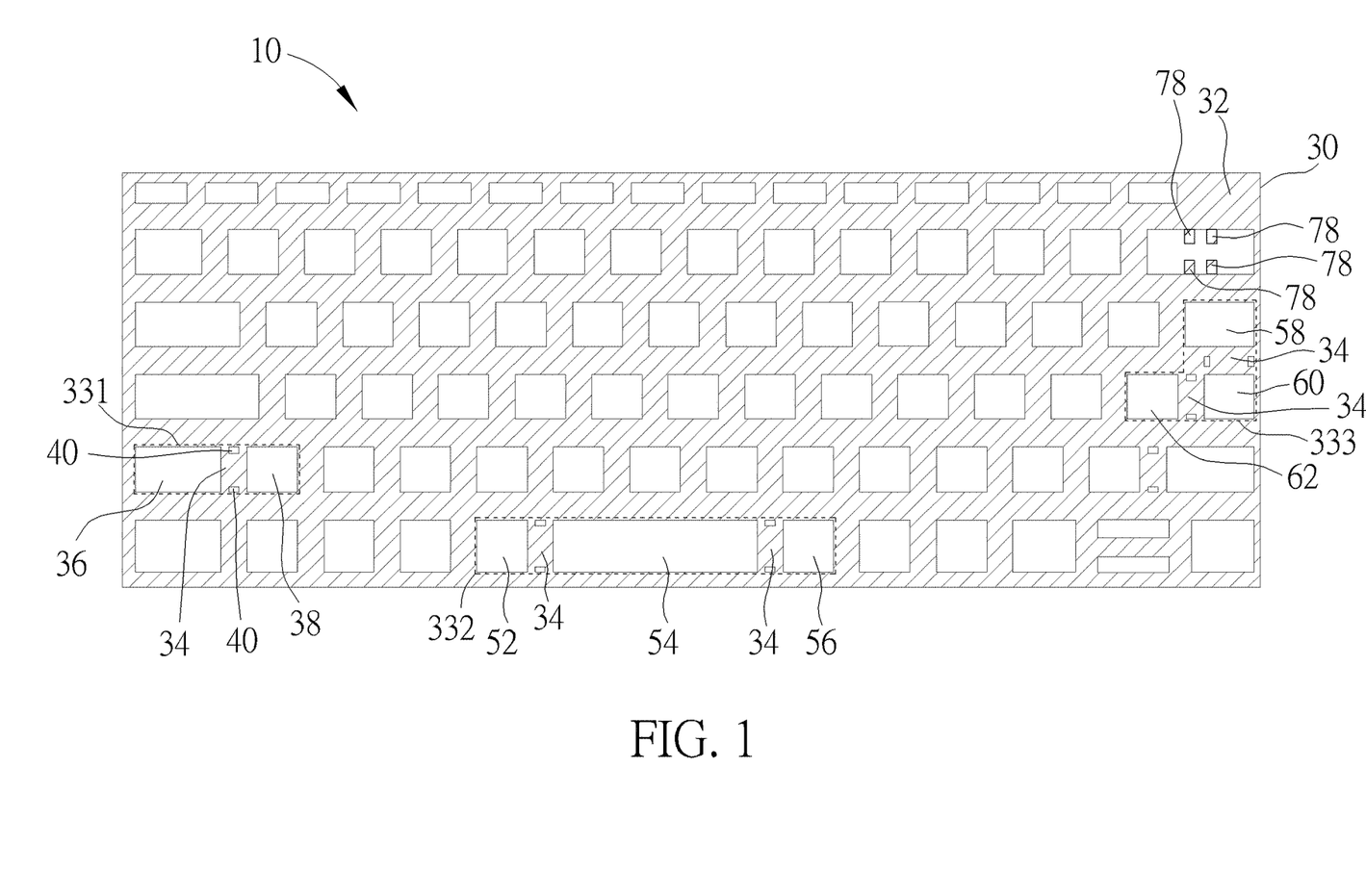
FIG. 1 is a top view of a masking sheet according to an embodiment of the present invention.
Figure 2:
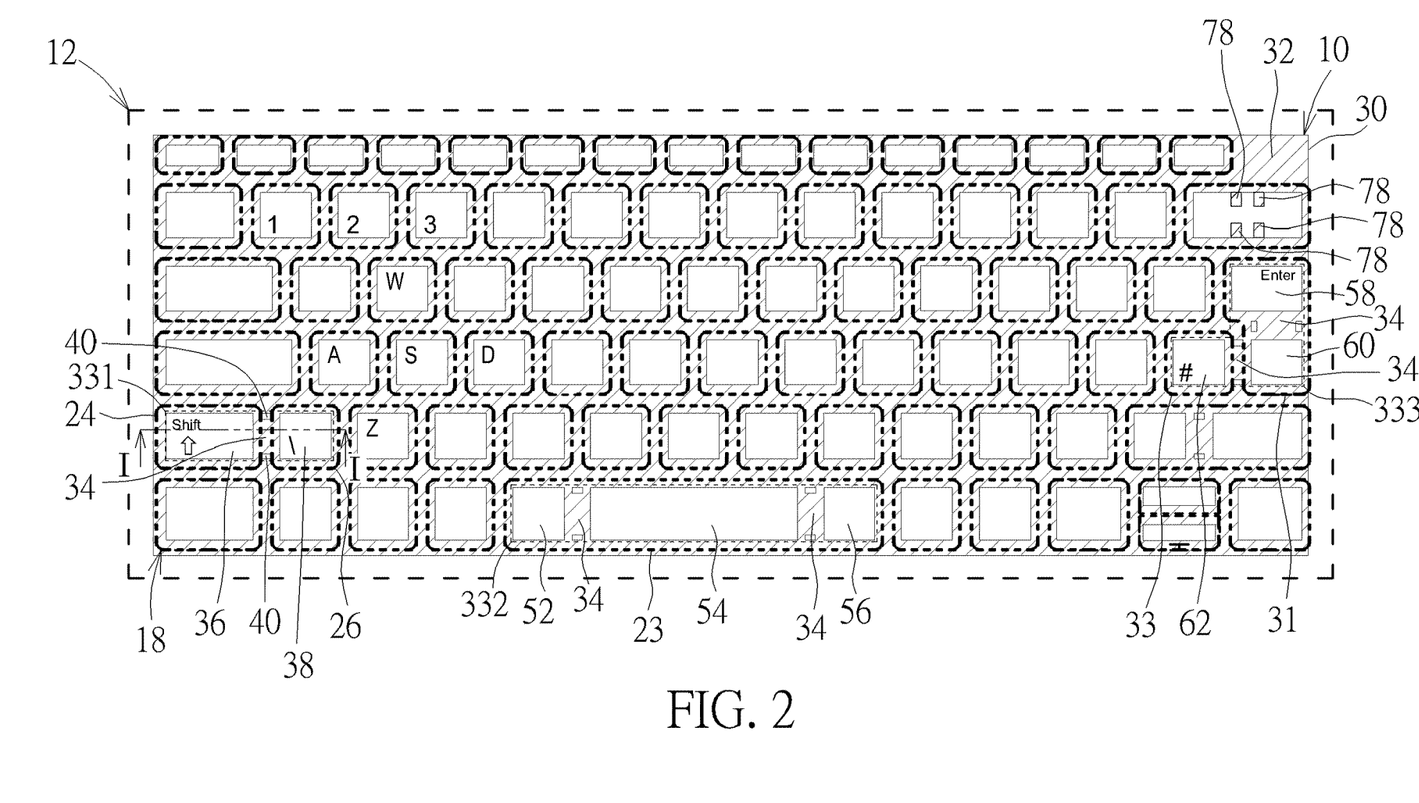
FIG. 2 is a top view of the masking sheet in FIG. 1 being disposed in a first backlight keyboard.
Figure 3:
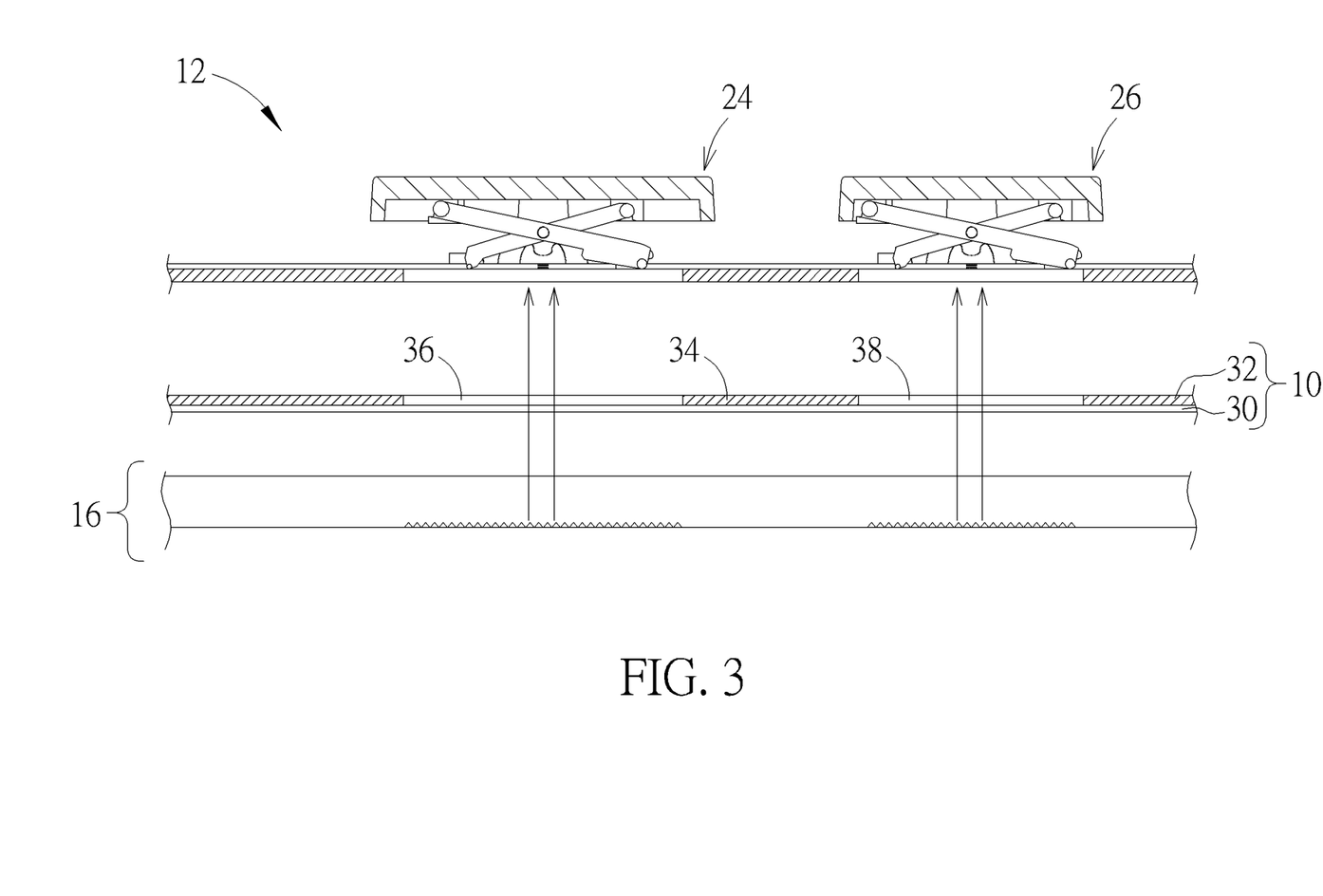
FIG. 3 is an exploded cross-sectional diagram of the first backlight keyboard in FIG. 2 along a cross-sectional line I-I.
Figure 4:
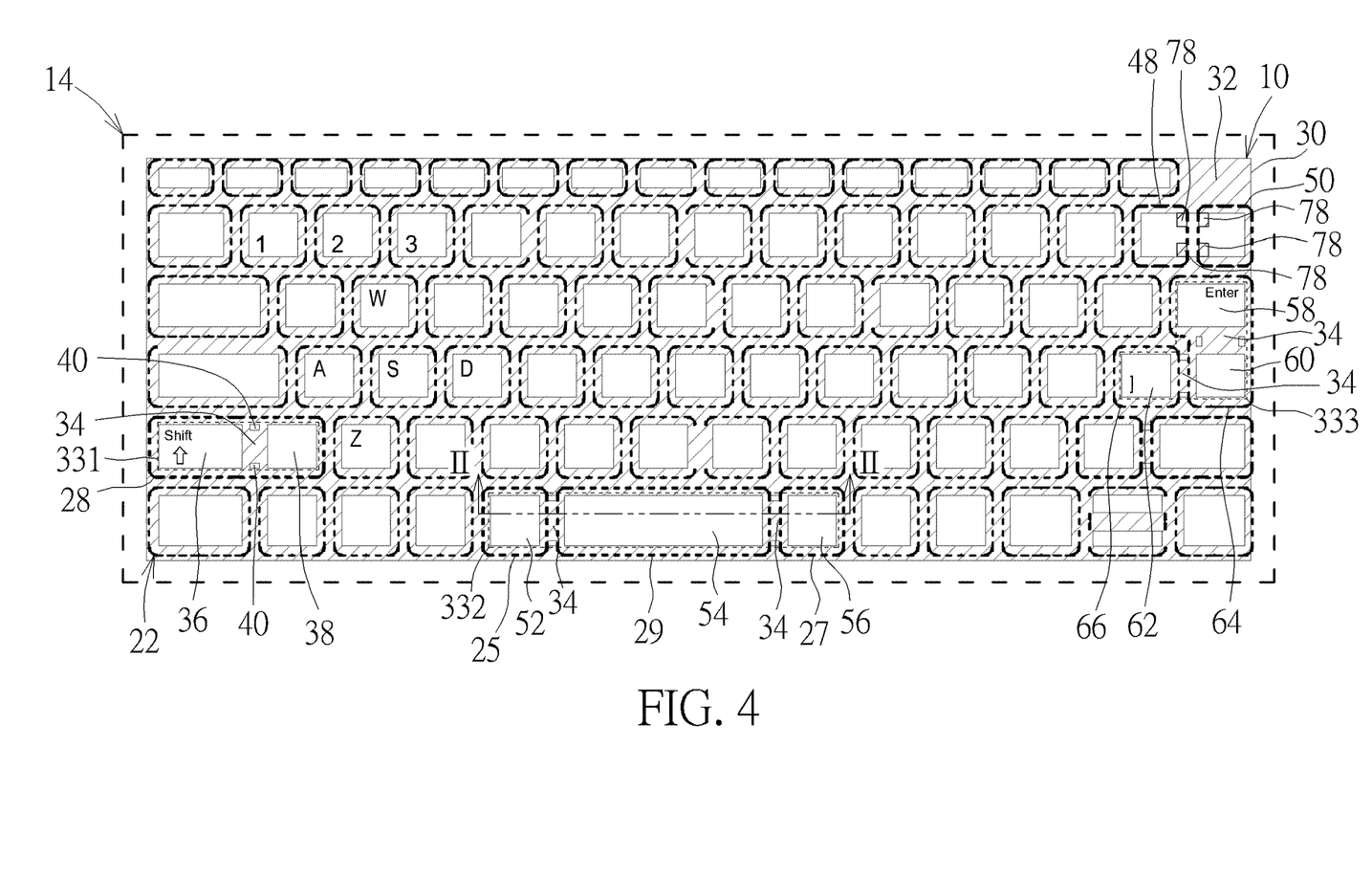
FIG. 4 is a top view of the masking sheet in FIG. 1 being disposed in a second backlight keyboard.
Figure 5:
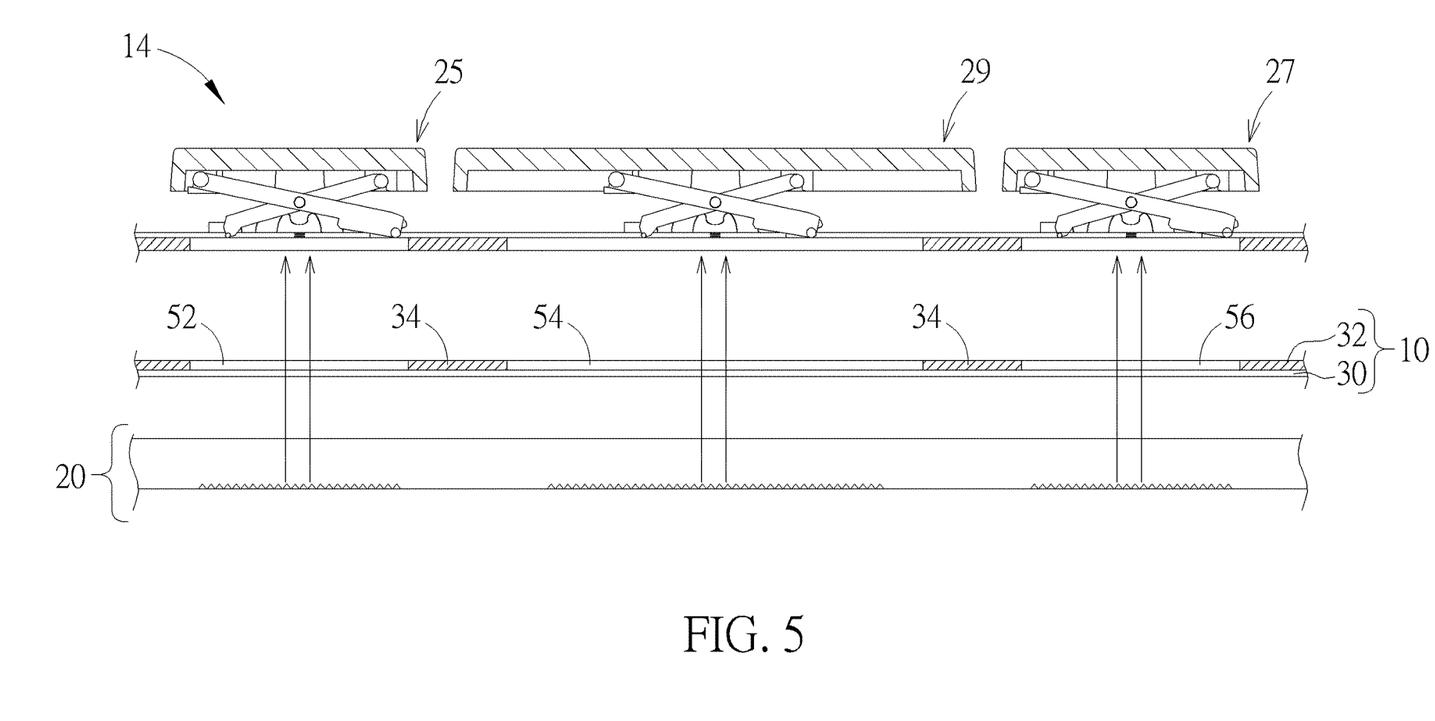
FIG. 5 is an exploded cross-sectional diagram of the second backlight keyboard in FIG. 4 along a cross-sectional line II-II.

Please refer to FIGS. 1-5. FIG. 1 is a top view of a masking sheet 10 according to an embodiment of the present invention. The masking sheet 10 has a plurality of light-exit regions, a plurality of masking sections 34, a first light-exit region layout 331, a second light-exit region layout 332, and a third light-exit region layout 333. The first light-exit region layout 331 includes light-exit regions 36 and 38 and a masking section 34. The second light-exit region layout 332 includes light-exit regions 52, 54, and 56 and two masking sections 34. The third light-exit region layout 333 is L-shaped and includes three light-exit regions 58, 60, and 62 and two masking sections 34. FIG. 2 is a top view of the masking sheet 10 in FIG. 1 being disposed in a first backlight keyboard 12. FIG. 3 is an exploded cross-sectional diagram of the first backlight keyboard 12 in FIG. 2 along a cross-sectional line I-I. FIG. 4 is a top view of the masking sheet 10 in FIG. 1 being disposed in a second backlight keyboard 14. FIG. 5 is an exploded cross-sectional diagram of the second backlight keyboard 14 in FIG. 4 along a cross-sectional line II-II. For clearly showing position relationships of the masking sheet 10 relative to a first language keyswitch set 18 of the first backlight keyboard 12 and a second language keyswitch set 22 of the second backlight keyboard 14 respectively, the first backlight keyboard 12 and the first language keyswitch set 18 are briefly depicted by bold dotted lines in FIG. 2, and the second backlight keyboard 14 and the second language keyswitch set 22 are briefly depicted by bold dotted lines in FIG. 4. As shown in FIGS. 1-5, the masking sheet 10 is suitable for light masking and transmission of the first backlight keyboard 12 and the second backlight keyboard 14. The first backlight keyboard 12 includes a first backlight module 16 and the first language keyswitch set 18 (including a plurality of keyswitches, such as W, A, S, D, and Enter keys, which are briefly depicted by bold dotted lines in FIG. 2). The second backlight keyboard 14 includes a second backlight module 20 and the second language keyswitch set 22 (including a plurality of keyswitches, such as W, A, S, D, and Enter keys, which are briefly depicted by bold dotted lines in FIG. 4). In such a manner, light generated by the first backlight module 16 can pass through the masking sheet 10 to be incident to the first language keyswitch set 18 for illuminating symbols on an upper surface of the first language keyswitch set 18. Furthermore, light generated by the second backlight module 20 can pass through the masking sheet 10 to be incident to the second language keyswitch set 22 for illuminating symbols on an upper surface of the second language keyswitch set 22.

In the embodiment that the first language keyswitch set 18 corresponds to U.K. language family, as shown in FIG. 2, a symbol on the first keyswitch 24 in the first language keyswitch set 18 is "⇧", and a symbol on the second keyswitch 26 in the first language keyswitch set 18 is "\", wherein the masking sheet 10 has the first light-exit region layout 331 corresponding to the first keyswitch 24 and the second keyswitch 26. In the embodiment that the second language keyswitch set 22 corresponds to Japanese language family, as shown in FIGS. 1-5, at least one pair of adjacent keyswitches (e.g. the first keyswitch 24 and the second keyswitch 26 adjacent to each other as shown in FIG. 2) in the first language keyswitch set 18 on the first backlight keyboard 12 coincides with the third keyswitch 28 in the second language keyswitch set 22 on the second backlight keyboard 14. Furthermore, a sum of pressing areas of the first keyswitch 24 and the second keyswitch 26 is substantially equal to a pressing area of the third keyswitch 28. The first language keyswitch set 18 further includes a fourth keyswitch 23. A position of the fourth keyswitch 23 on the first backlight keyboard 12 substantially coincides with positions of a fifth keyswitch 25, a sixth keyswitch 27 and a seventh keyswitch 29 on the second backlight keyboard 14. The masking sheet 10 has the second light-exit region layout 332 corresponding to the fourth keyswitch 23, the fifth keyswitch 25, the sixth keyswitch 27 and the seventh keyswitch 29, wherein the fourth keyswitch 23 could be a space key, and one of the fifth keyswitch 25, the sixth keyswitch 27 and the seventh keyswitch 29 could be a space key (in FIG. 4, the seventh keyswitch 29 is the space key, but not limited thereto).

The masking sheet 10 includes a transparent substrate 30 and a masking layer 32. The transparent substrate 30 is disposed between the first backlight module 16 and the first language keyswitch set 18 or between the second backlight module 20 and the second language keyswitch set 22. The masking layer 32 is formed preferably by a white ink layer printed on the transparent substrate 30. Furthermore, for preventing a user from seeing the white ink layer between the keyswitches so as to achieve the aesthetic keyboard appearance purpose, a black ink layer could be printed on the white ink layer. Moreover, as shown in FIG. 1, the first light-exit region layout 331 has the masking section 34 for reducing light leakage between the first keyswitch 24 and the second keyswitch 26. The masking section 34 further includes at least one light-exit slot 40 (two shown in FIG. 1, but not limited thereto), which allows that a part of light can be incident to a gap between the first keyswitch 24 and the second keyswitch 26 through the light-exit slot 40, so as to generate a continuous flare effect.

Via the aforesaid design, when the masking sheet 10 is disposed between the first backlight module 16 and the first language keyswitch set 18 (as shown in FIG. 3), light of the first backlight module 16 can pass through the first light-exit region layout 331 to be incident to the first keyswitch 24 and the second keyswitch 26, respectively, for illuminating the symbols on the first keyswitch 24 and the second keyswitch 26. On the other hand, when the masking sheet 10 is disposed between the second backlight module 20 and the second language keyswitch set 22 (as shown in FIG. 5), light of the second backlight module 20 can pass through the first light-exit region layout 331 to be incident to the third keyswitch 28, for illuminating a symbol on the third keyswitch 28. Furthermore, light can pass through the second light-exit region layout 332 on the masking sheet 10 to be incident to the fifth keyswitch 25 and the sixth keyswitch 27 in the second language keyswitch set 22 as shown in FIG. 4, for illuminating symbols on the fifth keyswitch 25 and the sixth keyswitch 27.

In summary, no matter the masking sheet 10 is disposed in the first backlight keyboard 12 having the first language keyswitch set 18 or the second backlight keyboard 14 having the second language keyswitch set 22, the masking sheet 10 not only can allow light of the first backlight module 16 to be incident to the first keyswitch 24 and the second keyswitch 26 through the light-exit regions 36 and 38, but also can allow light of the second backlight module 20 to be incident to the third keyswitch 28 through the light-exit regions 36 and 38. Light of the first backlight module 16 can also be blocked by the masking section 34 for reducing light leakage between the first keyswitch 24 and the second keyswitch 26. In such a manner, the present invention can achieve the effect that the first light-exit region layout 331 and the second light-exit region layout 332 on the masking sheet 10 can be suitable for the first backlight keyboard 12 and the second backlight keyboard 14, for efficiently solving the prior art problem that the masking sheet cannot be commonly applied to different backlight keyboards with different language families so as to reduce the manufacturing cost of the masking sheet.

Figure 6:
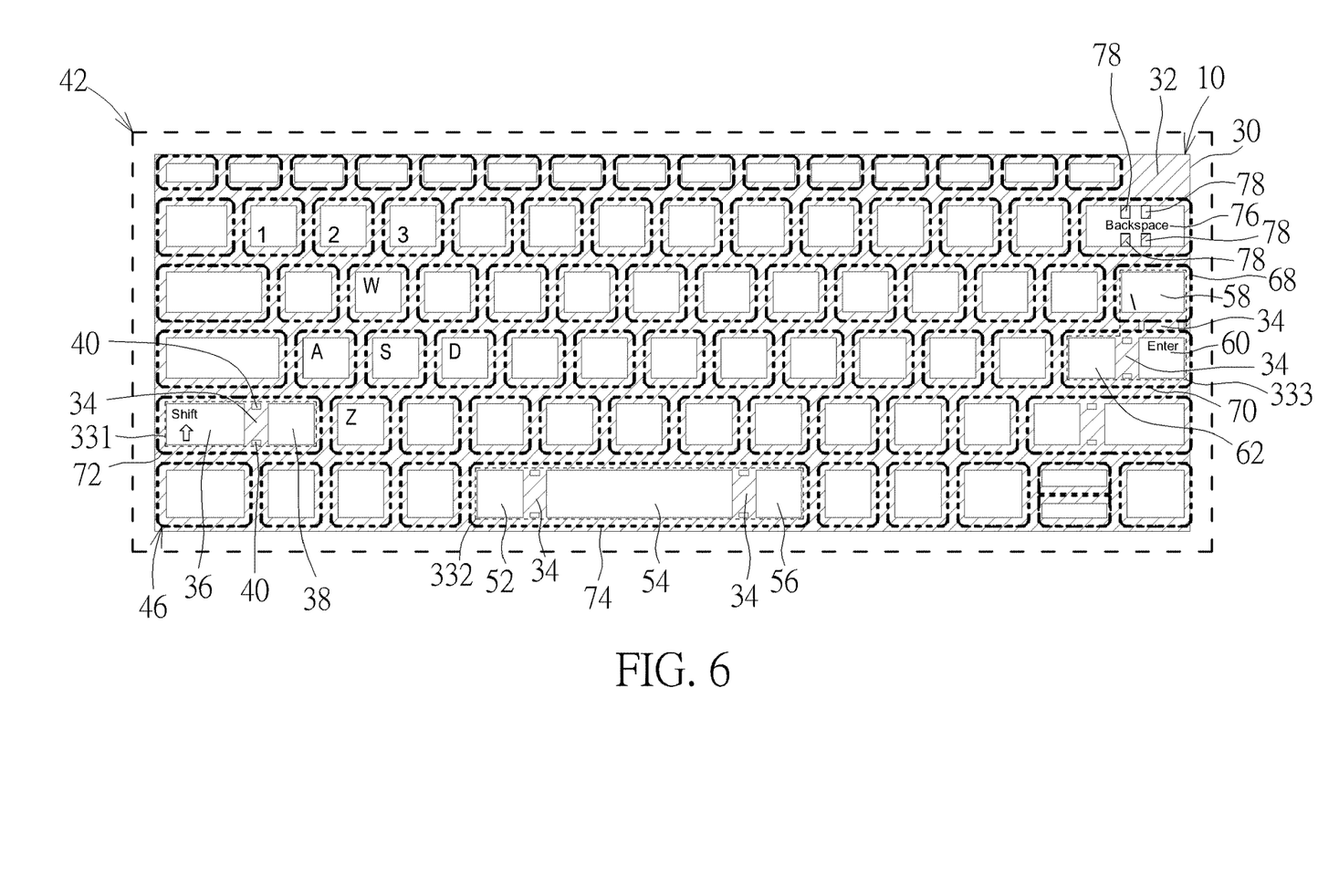
FIG. 6 is a top view of the masking sheet in FIG. 2 being disposed in a third backlight keyswitch.

In addition, the light-exit region design of the masking sheet of the present invention could be applied to a third backlight keyboard. Please refer to FIG. 1 and FIG. 6. FIG. 6 is a top view of the masking sheet 10 in FIG. 1 being disposed in a third backlight keyboard 42. For clearly showing a position relationship of the masking sheet 10 relative to a third language keyswitch set 46 of the third backlight keyboard 42, the third backlight keyboard 42 and the third language keyswitch set 46 are briefly depicted by bold dotted lines in FIG. 6. As shown in FIG. 1 and FIG. 6, the masking sheet 10 is suitable for light masking and transmission of the third backlight keyboard 42. The third backlight keyboard 42 includes a backlight module (not shown in the figures). The related description of the aforesaid backlight module could be reasoned by analogy according to FIG. 3 and FIG. 5 and omitted herein. The third backlight keyboard 42 further includes the third language keyswitch set 46 (including a plurality of keyswitches, such as W, A, S, D, and Enter keys, which are briefly depicted by bold dotted lines in FIG. 6). In such a manner, light generated by the backlight module of the third backlight keyboard 42 can pass through the masking sheet 10 to be incident to the third language keyswitch set 46 for illuminating symbols on the third language keyswitch set 46.

In the embodiment that the third language keyswitch set 46 corresponds to U.S. language family, as shown in FIG. 1, FIG. 4 and FIG. 6, at least one pair of adjacent keyswitches (e.g. adjacent keyswitches 64 and 66 as shown in FIG. 4) in the second language keyswitch set 22 on the second backlight keyboard 14 coincides with keyswitches 68 and 70 in the third language keyswitch set 46 on the third backlight keyboard 42. Furthermore, a sum of pressing areas of the keyswitches 64 and 66 is substantially equal to a sum of pressing areas of the keyswitches 68 and 70. The masking sheet 10 has the third light-exit region layout 333 corresponding to the keyswitches 64, 66, 68, and 70 for allowing light of the backlight module to pass through the third light-exit region layout 333, so as to illuminate symbols on the keyswitches 64, 66, 68, and 70. The third light-exit region layout 333 is L-shaped. One of the keyswitches 64 and 66 includes an Enter key (in FIG. 4, the keyswitch 64 is the Enter key, but not limited thereto), and one of the keyswitches 68 and 70 includes an Enter key (in FIG. 6, the keyswitch 70 is the Enter key, but not limited thereto).

Furthermore, as shown in FIG. 2, when the masking sheet 10 is disposed in the first backlight keyboard 12, light of the first backlight module 16 can be incident to symbols on keyswitches 31 and 33 in the first language keyswitch set 18 through the third light-exit region layout 333. One of the keyswitches 31 and 33 includes an Enter key (in FIG. 2, the keyswitch 31 is the Enter key, but not limited thereto).

Moreover, as shown in FIG. 6, when the masking sheet 10 is disposed in the third backlight keyboard 42, light of the backlight module of the third backlight keyboard 42 can be incident to a symbol on a keyswitch 72 in the third language keyswitch set 46 through the third light-exit region layout 333 and incident to a symbol on a keyswitch 74 in the third language keyswitch set 46 through the second light-exit region layout 332.

In summary, the present invention can achieve the effect that the masking sheet 10 can be suitable for the first backlight keyboard 12, the second backlight keyboard 14, and the third backlight keyboard 42, for efficiently solving the prior art problem that the masking sheet cannot be commonly applied to different backlight keyboards with different language families so as to reduce the manufacturing cost of the masking sheet.

In practical application, as shown in FIG. 4 and FIG. 6, for solving the problem that light of the second backlight module 20 is emitted out of a corner region between two adjacent keyswitches 48 and 50 in the second language keyswitch set 22 to cause an over-bright flare at the corner region, the masking layer 32 could have at least one block 78 extending from a position corresponding to at least one side of a gap between the keyswitches 48 and 50 toward a transparent pattern 76. For example, as shown in FIG. 4 and FIG. 6, there are four blocks 78 (but not limited thereto) extending from two sides of the gap between the keyswitches 48 and 50 toward the transparent pattern 76, respectively. In such a manner, light emitted out of the corner region between the keyswitches 48 and 50 can be appropriately blocked by the blocks 78, so as to solve the aforesaid over-bright flare problem.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight keyboard comprising:
   a first language keyswitch set having a first keyswitch and a second keyswitch adjacent to each other;
   a first backlight module disposed under the first language keyswitch set for providing light to the first language keyswitch set; and
   a masking sheet for the backlight keyboard and a second backlight keyboard, the second backlight keyboard comprising a second backlight module and a second language keyswitch set, positions of the first keyswitch and the second keyswitch on the backlight keyboard coinciding with a position of a third keyswitch in the second language keyswitch set on the second backlight keyboard, the masking sheet having a first light-exit region layout corresponding to the first keyswitch, the second keyswitch and the third keyswitch for guiding light to be incident to symbols on the first keyswitch, the second keyswitch and the third keyswitch.

2. The backlight keyboard of claim 1, wherein the first language keyswitch set is a keyswitch set corresponding to a U.K. language family, and the second language keyswitch set is a keyswitch set corresponding to a Japanese language family.

3. The backlight keyboard of claim 2, wherein a symbol on one of the first keyswitch and the second keyswitch is an arrow, and the third keyswitch is identified as a Shift key.

4. The backlight keyboard of claim 1, wherein the first language keyswitch set further includes a fourth keyswitch, a position of the fourth keyswitch on the backlight keyboard coincides with positions of a fifth keyswitch, a sixth keyswitch, and a seventh keyswitch in the second language keyswitch set on the second backlight keyboard, and the masking sheet has a second light-exit region layout corresponding to the fourth keyswitch, the fifth keyswitch, the sixth keyswitch, and the seventh keyswitch for guiding light to be incident to symbols on the fourth keyswitch, the fifth keyswitch, the sixth keyswitch, and the seventh keyswitch.

5. The backlight keyboard of claim 4, wherein the fourth keyswitch is a space key, and one of the fifth keyswitch, the sixth keyswitch, and the seventh keyswitch is a space key.

6. The backlight keyboard of claim 1, wherein the masking sheet further includes a third light-exit region layout, and the third light-exit region layout is L-shaped.

7. The backlight keyboard of claim 6, wherein at least one keyswitch corresponding to the third light-exit region layout is identified as an Enter key.

8. The backlight keyboard of claim 1, wherein the first light-exit region layout includes a masking section.

9. The backlight keyboard of claim 8, wherein the masking section has at least one light-exit slot.

\* \* \* \* \*